(12) United States Patent
Kim

(10) Patent No.: US 10,108,297 B2
(45) Date of Patent: Oct. 23, 2018

(54) METHOD AND DEVICE FOR SENSING TOUCH INPUT BY USING FEEDBACK CONNECTION CHANGE BETWEEN TWO FEEDBACK CAPACITORS

(71) Applicant: ZINITIX CO., LTD., Gyeonggi-do (KR)

(72) Inventor: Bok-Man Kim, Seoul (KR)

(73) Assignee: ZINITIX CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/983,660

(22) Filed: Dec. 30, 2015

(65) Prior Publication Data

US 2016/0188116 A1 Jun. 30, 2016

(30) Foreign Application Priority Data

Dec. 31, 2014 (KR) .......................... 10-2014-019547

(51) Int. Cl.
*G06F 3/045* (2006.01)
*G06F 3/041* (2006.01)
*G06F 3/044* (2006.01)

(52) U.S. Cl.
CPC ............ *G06F 3/0418* (2013.01); *G06F 3/044* (2013.01); *G06F 3/041* (2013.01)

(58) Field of Classification Search
None
See application file for complete search history.

(56) References Cited

U.S. PATENT DOCUMENTS

| 2011/0310054 A1* | 12/2011 | Souchkov | G06F 3/044 345/174 |
| 2015/0309655 A1* | 10/2015 | Park | G06F 3/0416 345/173 |
| 2016/0124544 A1* | 5/2016 | Kang | G06F 3/044 345/174 |

FOREIGN PATENT DOCUMENTS

| JP | 2011-100450 | 5/2011 |
| JP | 2014-206844 | 10/2014 |
| KR | 1020100098388 | 10/2010 |
| KR | 1020100128363 | 12/2010 |

* cited by examiner

*Primary Examiner* — Stephen T Reed
(74) *Attorney, Agent, or Firm* — Mayer & Williams, PC; Stuart H. Mayer

(57) ABSTRACT

A technology to sense a touch input by the alternate feedback connection of two feedback capacitors connected to a single operational amplifier is disclosed.

7 Claims, 10 Drawing Sheets

FIG. 1B
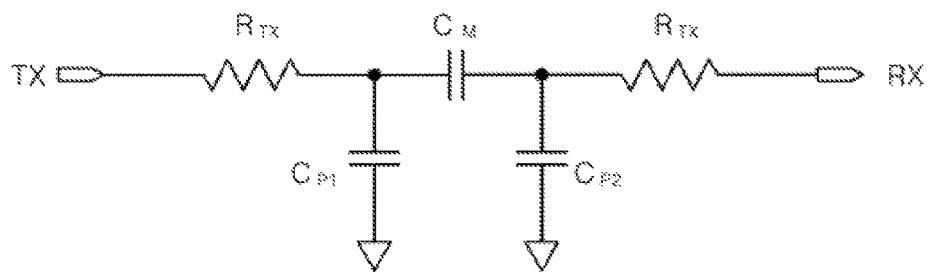
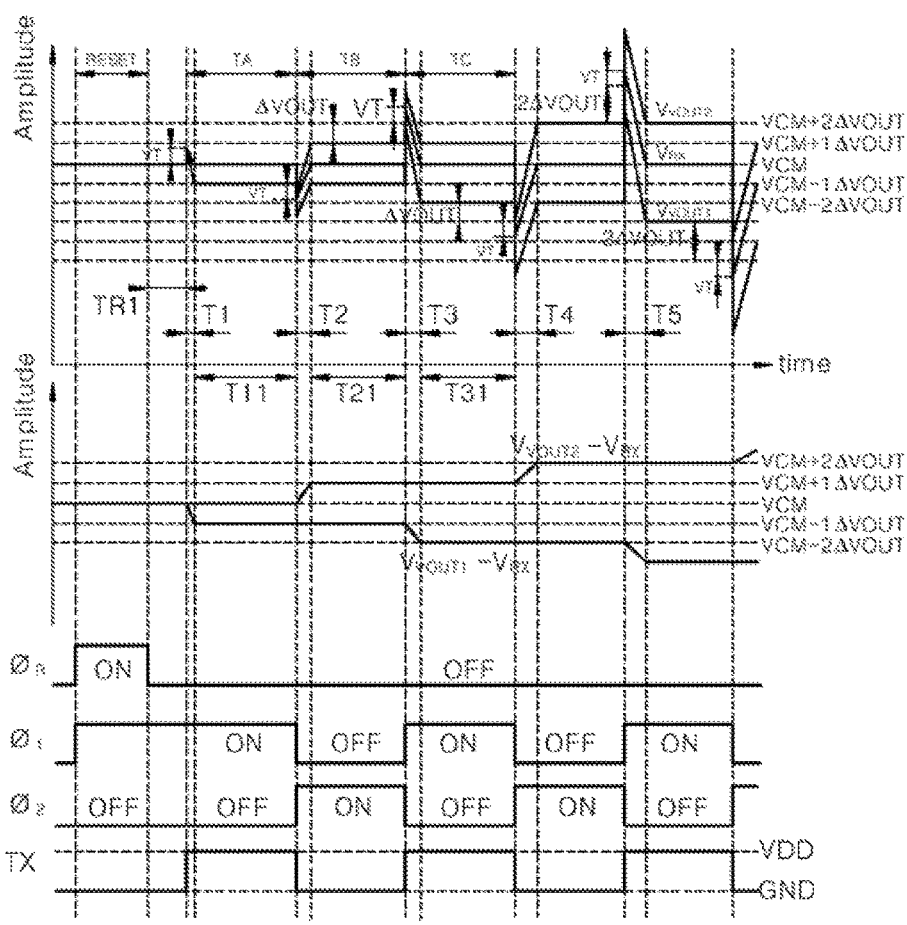
FIG. 2A
FIG. 2B
FIG. 2C
FIG. 2D
FIG. 2E
FIG. 2F

METHOD AND DEVICE FOR SENSING TOUCH INPUT BY USING FEEDBACK CONNECTION CHANGE BETWEEN TWO FEEDBACK CAPACITORS

CROSS-REFERENCE TO RELATED APPLICATION

This application claims priority to Korean Patent Application No. 10-2014-0195472 filed on Dec. 31, 2014 and all the benefits accruing therefrom under 35 U.S.C. § 119, the contents of which are incorporated by reference in their entirety.

BACKGROUND

The present disclosure relates to a touch input sensing device, and more particularly, to a sensing device that may reduce a circuit area and uniformly maintain touch input sensitivity.

A display device, such as a liquid crystal display (LCD), an organic light-emitting display (OLED), etc., a portable transmission device, other information processing devices, etc. perform functions by using various input devices. In recent, a touch screen device is being frequently used in a portable phone, a smart phone, a palm-size PC, an automated teller machine (ATM) device, etc. as such an input device.

In recent, it is a trend that the touch screen is disposed on the screen, a character is written or a picture is painted by the contact of a finger or touch pen (stylus) with a touch panel, and a desired command is executed by the clicking of an icon. The touch screen device may discern whether the finger, touch pen, etc. is in contact with the screen and information on the contact position.

Touch screens may be generally classified into a resistive type and a capacitive type according to a method of sensing a touch.

The resistive type touch screen has a structure in which glass or a transparent plastic plate is coated with a resistive material on which a polyester film is covered. The resistive type touch screen senses a touch point by the detection of a change in resistance that appears when a screen is touched. The resistive type touch screen has a drawback in that the touch is not sensed when pressure is weak.

On the contrary, the capacitive type touch screen forms electrodes on both or either of the surfaces of glass or transparent plastic, applies a voltage to between two electrodes, analyzes a change in capacitance between two electrodes appearing when a finger is in contact with the screen, and senses a touch point.

In order for the capacitive type touch screen to sense the touch point, a circuit is needed which measures a capacitance that is formed by one electrode or between two electrodes. Such a capacitance measurement circuit has been mostly used in order to measure the capacitances of various circuits or devices, and as various portable devices provide touch input interfaces recently, a range to which the capacitance measurement circuit capable of sensing the contact and approach of a user is applied is being expanded.

A typical capacitance measurement circuit may use two operational amplifiers (OA) for a single measurement channel in order to remove DC noise or low-frequency noise. However, since two OAs are used for the single measurement channel, there is a drawback in that the area of the circuit increases. Also, each OA may have a fabrication error. Due to such a fabrication error, a measurement value at the single measurement channel may appear differently from design intent. However, since such a fabrication error may vary according to a measurement channel, there is a drawback in that a measurement result at each measurement channel is non-uniform.

SUMMARY

The present disclosure provides a touch input sensing device that may reduce an impact on input noise, though a single operational amplifier OA is used.

A method for sensing a touch input using a touch input sensing device provided in accordance with an aspect of the present disclosure includes an operational amplifier, a sensing electrode connected to an inverting input terminal of the operational amplifier, and a driving electrode capacitively coupled to the sensing electrode. In this case, the method includes a first step of controlling a voltage of the driving electrode to become a first voltage, and connecting a first feedback capacitor to an output terminal of the operational amplifier to form a first feedback path, one terminal of the first feedback capacitor being connected to the inverting input terminal; and after the first step, a second step of controlling the voltage of the driving electrode to become a second voltage, and connecting a second feedback capacitor to the output terminal of the operational amplifier to form a second feedback path, one terminal of the second feedback capacitor being connected to the inverting input terminal.

In addition, when the inverting input terminal of the operational amplifier is connected to the output terminal of the operational amplifier to form a feedback path, the feedback path is formed through only one of the first feedback capacitor and the second feedback capacitor.

Also, the touch input sensing device further includes a first switch connecting the output terminal of the operational amplifier to the other terminal of the first feedback capacitor to form the first feedback path, the first switch being operated according to a first pulse train; and a second switch connecting the output terminal of the operational amplifier to the other terminal of the second feedback capacitor to form the second feedback path, the second switch being operated according to a second pulse train.

A touch input sensing device provided in accordance with another aspect of the present disclosure includes an operational amplifier; a sensing electrode connected to an inverting input terminal of the operational amplifier; a driving electrode capacitively coupled to the sensing electrode; a first feedback capacitor configured to be connected to the inverting input terminal; a second feedback capacitor configured to be connected to the inverting input terminal; a switching part comprising a plurality of switches connected to the driving electrode, the first feedback capacitor, the second capacitor, and an output terminal of the operational amplifier; and a control part. In this case, the control part is configured to perform: a first step of controlling the switching part in order that a voltage of the driving electrode to become a first voltage, and in order that the first feedback capacitor is connected to the output terminal of the operational amplifier to form a first feedback path; and after the first step, a second step of controlling the switching part in order that the voltage of the driving electrode to become a second voltage, and in order that the second feedback capacitor is connected to the output terminal of the operational amplifier to form a second feedback path.

In this case, the switching part includes a first switch connecting the output terminal of the operational amplifier to the other terminal of the first feedback capacitor to form the first feedback path, the first switch being operated according to a first pulse train; and a second switch connecting the output terminal of the operational amplifier to the other terminal of the second feedback capacitor to form the second feedback path, the second switch being operated according to a second pulse train.

A touch input sensing device provided in accordance with another aspect of the present disclosure includes an operational amplifier; a first feedback capacitor connected to an inverting input terminal of the operational amplifier through one terminal of the first feedback capacitor; a second feedback capacitor connected to the inverting input terminal of the operational amplifier through one terminal of the second feedback capacitor; a first switch connecting an output terminal of the operational amplifier to the other terminal of the first feedback capacitor to form a first feedback path, the first switch being operated according to a first pulse train; a second switch connecting the output terminal of the operational amplifier to the other terminal of the second feedback capacitor to form a second feedback path, the second switch being operated according to a second pulse train; a sensing electrode connected to the inverting input terminal of the operational amplifier; and a driving electrode capacitively coupled to the sensing electrode. In this case, the first pulse train and the second pulse train have time-domain shapes such that the first switch and the second switch is not simultaneously in a closed state.

Also, the touch input sensing device further includes a driving part controlling a voltage of the driving electrode, wherein, the driving part is configured to control the voltage of the driving electrode so that the voltage of the driving electrode switches between a first voltage and a second voltage by being synchronized with the first pulse train or the second pulse train.

Also, the operational amplifier comprises an operational transconductance amplifier, a first output driver, and a second output driver, the other terminal of the first feedback capacitor is connected to an output terminal of the first output driver, the other terminal of the second feedback capacitor is connected to an output terminal of the second output driver, the first switch connects between an output terminal of the operational transconductance amplifier and an input terminal of the first output driver, and the second switch connects between the output terminal of the operational transconductance amplifier and an input terminal of the second output driver.

In this case, the inverting input terminal of the operational amplifier is an inverting input terminal of the operational transconductance amplifier, and the non-inverting input terminal of the operational amplifier is a non-inverting input terminal of the operational transconductance amplifier.

A touch IC for a touch input sensing device provided in accordance with another aspect of the present disclosure includes a sensing electrode, a driving electrode capacitively coupled to the sensing electrode, a sensing signal driving part, and a control part. The touch IC includes an operational amplifier; a first feedback capacitor configured to be connected to an inverting terminal of the operational amplifier; a second feedback capacitor configured to be connected to the inverting terminal of the operational amplifier; and a feedback path selection switch part, In this case, the feedback path selection switch part is configured to connect an output terminal of the operational amplifier selectively to one of the first feedback capacitor and the second feedback capacitor.

In this case, the touch IC further includes the control part, wherein, the feedback path selection switch part is configured to be connected to the control part, and the control part is configure to perform: a first step for controlling the sensing signal driving part and the feedback path selection switch part in order that a voltage of the driving electrode becomes a first voltage, and the first feedback capacitor is connected to the output terminal of the operational amplifier to form a first feedback path; and a second step for controlling the sensing signal driving part and the feedback path selection switch part in order that the voltage of the driving electrode becomes a second voltage, and the second feedback capacitor is connected to the output terminal of the operational amplifier to form a second feedback path.

Also, the feedback path selection switch part includes a first switch configured to connect the output terminal of the operational amplifier to the first feedback capacitor, and a second switch configured to connect the output terminal of the operational amplifier to the second feedback capacitor.

BRIEF DESCRIPTION OF THE DRAWINGS

Exemplary embodiments can be understood in more detail from the following description taken in conjunction with the accompanying drawings, in which:

FIG. 1B represents the equivalent circuit of a touch screen panel (TSP).

FIGS. 2A to 2F are timing diagrams that represent, according to a time, states at switches $\emptyset_R$, $\emptyset_1$, and $\emptyset_2$ and terminals TX, RX, VOUT1, and VOUT2 of the sensing device 100 in FIG. 1A.

DETAILED DESCRIPTION OF EMBODIMENTS

In the following, embodiments of the present disclosure are described with reference to the accompanying drawings. However, the present disclosure is not limited to the embodiments described in the specification and may be implemented in other forms. The terms used herein are to help the understanding of the embodiments and are not intended to define the scope of the present disclosure. Also, singular forms used below also include plural forms unless stated to the contrary.

Embodiment 1

Figure 1A:
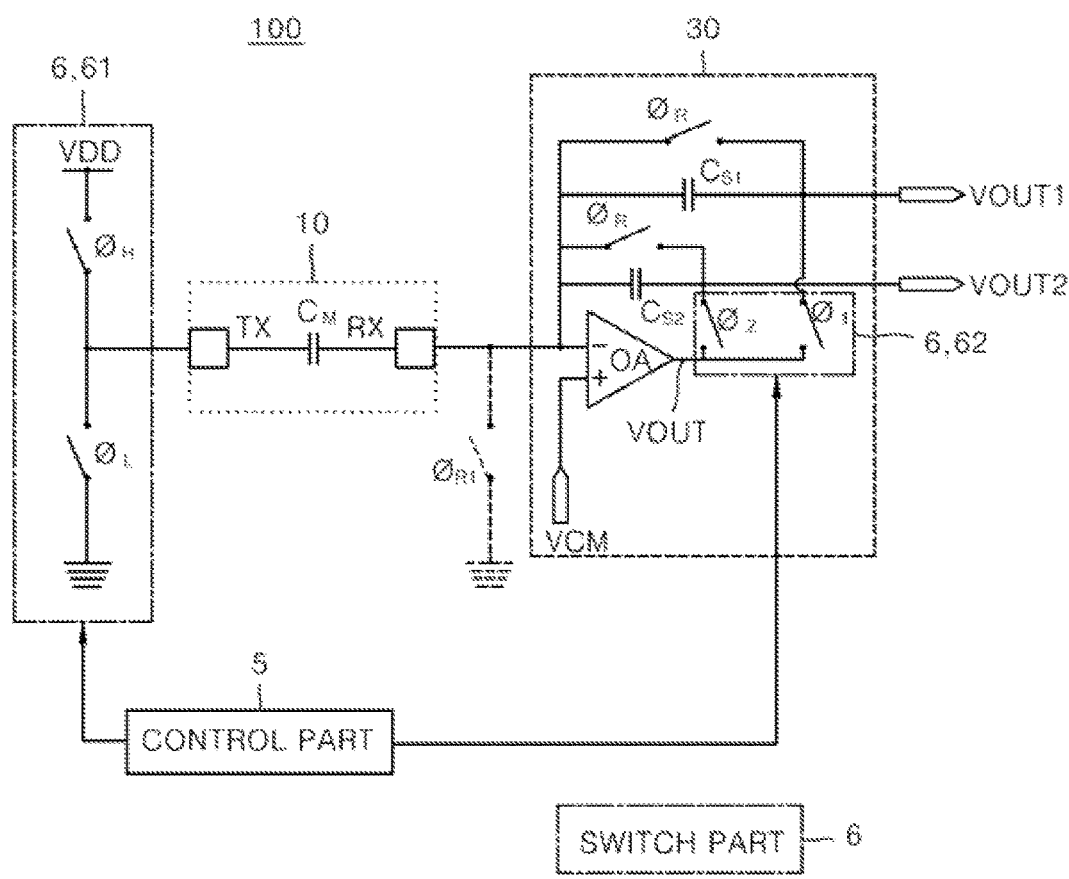
FIG. 1A represents the fundamental structure of a sensing device 100 that uses a single operational amplifier (OA) in order to measure whether there is a touch input to a capacitive type touch panel in accordance with a first embodiment.

FIG. 1A represents the fundamental structure of a sensing device 100 that uses a single operational OA in order to measure whether there is a touch input to a capacitive type touch panel in accordance with a first embodiment.

The sensing device 100 may include a sensing signal reception device 30, a TSP 10, a sensing signal driving device 61, a switch part 6, and a control part 5. In the present disclosure, the TSP may also be referred to as a 'touch panel'.

The TSP 10 may include a driving electrode TX and a sensing electrode RX, and further include a capacitor $C_M$ that is formed by the driving electrode TX and the sensing electrode RX. The driving electrode TX may be referred to as a 'TX terminal', and the sensing electrode RX may be referred to as an 'RX terminal'. Although the equivalent circuit of the TSP 10 may also be represented by a single capacitor $C_M$ as represented in FIG. 1A, it may also be represented by a pi model that includes resistors RTX and RRX, capacitors CP1 and CP2, and a capacitor $C_M$ as represented in FIG. 1B.

The sensing signal reception device 30 may include a single OPERATIONAL AMPLIFIER OA, two feedback capacitors $C_{S1}$ and $C_{S2}$, a reset switch $\emptyset_R$, and a feedback path selection switch part 62. The inverting input terminal of the OPERATIONAL AMPLIFIER OA is connected to the sensing electrode that acts as one terminal of the capacitor $C_M$. In addition, the inverting input terminal—and an output part VOUT of the operational amplifier OA may be connected to each other through a first feedback capacitor $C_{S1}$ or a second feedback capacitor $C_{S2}$. In addition, a first switch $\emptyset_1$ and a second switch $\emptyset_2$ are connected to between feedback capacitors $C_{S1}$ and $C_{S2}$ and the output part VOUT. The output part VOUT is selectively connected to output terminals VOUT1 and VOUT2 through the first switch $\emptyset_1$ and the second switch $\emptyset_2$ That is, when only the first switch $\emptyset_1$ is in an on state, the output part VOUT is the same as the output terminal VOUT1, and when only the second switch $\emptyset_2$ is in an on state, the output part VOUT is the same as the output terminal VOUT2. In addition, reset switches OR may be connected in parallel with the first feedback capacitor $C_{S1}$ and the second feedback capacitor $C_{S2}$, respectively. The non-inverting input terminal of the operational amplifier OA may be connected to a voltage VCM. In this case, the voltage VCM may be ground GND or have a certain voltage value. The operational amplifier OA may include a single operational transconductance amplifier OTA (not shown) and a single output driver (not shown). The sensing signal reception device 30 may be provided as a packaged chip that is separated from the TSP 10.

The sensing signal driving device 61 may include a third switch $\emptyset_H$ and a fourth switch $\emptyset_L$. The sensing signal driving device 61 may use the third switch $\emptyset_H$ and the fourth switch $\emptyset_L$ to selectively connect the driving electrode TX to a first voltage (e.g., VDD) and a second voltage (e.g., GND).

In the present disclosure, a chip that includes the sensing signal reception device 30 and the sensing signal driving device 61 may also be referred to as a touch IC. The TSP 10 may be provided as a device independent of the touch IC.

The feedback path selection switch part 62 and the sensing signal driving device 61 may be collectively referred to as the switching part 6.

FIG. 2A to 2F are timing diagrams that represent, according to a time, states at switches $\emptyset_R$, $\emptyset_1$, and $\emptyset_2$ and terminals TX, RX, VOUT1, and VOUT2 of the sensing device 100 in FIG. 1A.

FIG. 2A is a graph that represents, according to a time, the voltage $V_{VOUT1}$ of the output terminal VOUT1, the voltage $V_{VOUT2}$ of the output terminal VOUT2, and the voltage $V_{RX}$ of the RX terminal.

FIG. 2B is a graph that represents, according to a time, the voltage difference between the output terminal VOUT1 and the RX terminal, and the voltage difference between the output terminal VOUT2 and the RX terminal.

FIGS. 2C to 2E represent, according to a time, the ON and OFF states of the reset switch $\emptyset_R$), the first switch $\emptyset_1$, and the second switch $\emptyset_2$, respectively.

In addition, FIG. 2F represents the voltage of the driving electrode TX according to a time. The voltage of the driving electrode TX may be controlled according to the ON/OFF state of the switches $\emptyset_H$ and $\emptyset_L$. In this case, the switches $\emptyset_H$ and $\emptyset_L$ do not simultaneously have ON states.

The vertical axes of the graphs in FIGS. 2A and 2B represent the size of a voltage and the horizontal axes thereof represent the time.

Figure 3A:
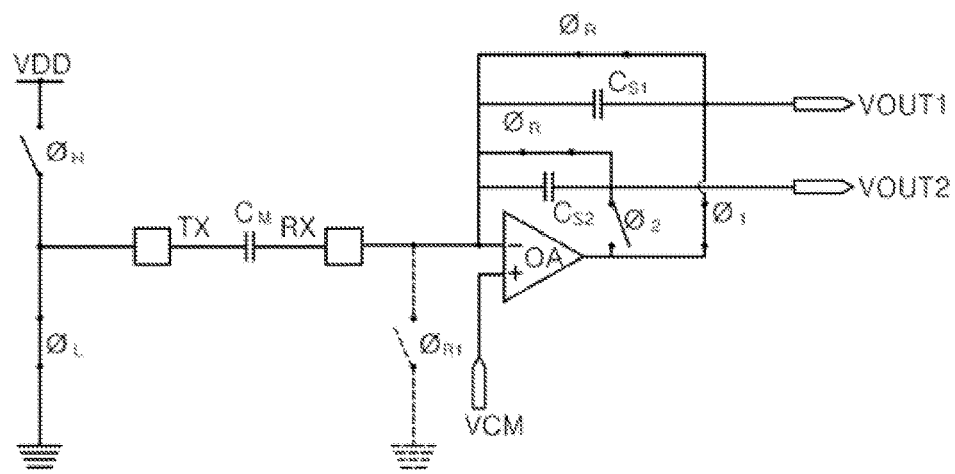
FIGS. 3A to 3C represent circuits that apply the ON and OFF states of each switch at each time section in FIG. 2 to the sensing device 100 in FIG. 1A.
Figure 3B:
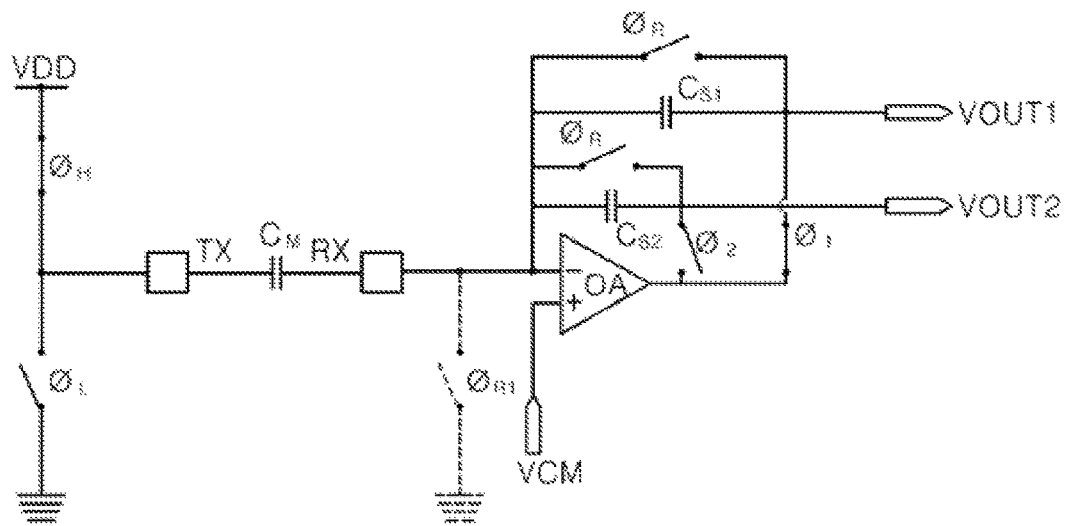
Figure 3C:
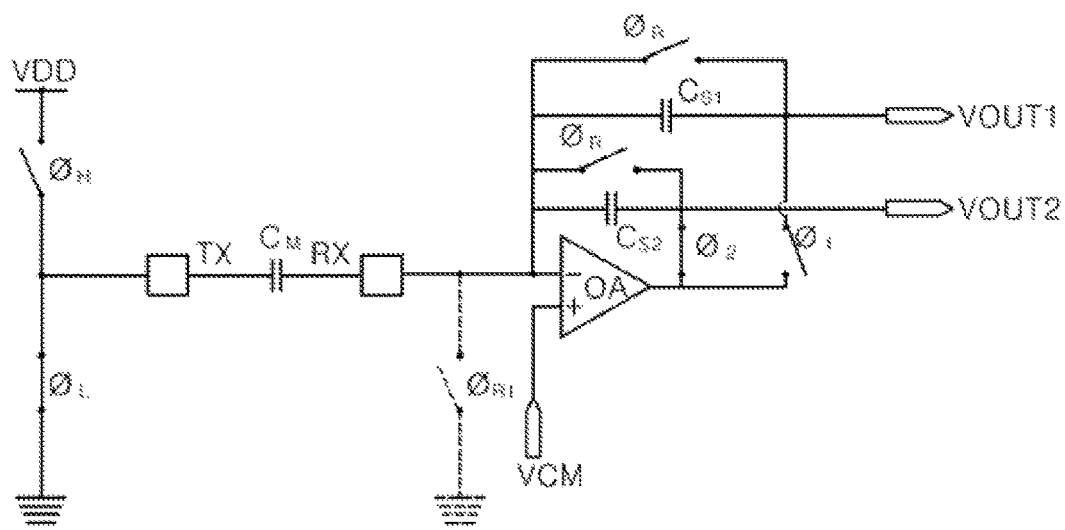

FIGS. 3A to 3C represent the ON and OFF states of each switch of the sensing device 100 in FIG. 1A at each time section in FIGS. 2A to 2F.

In the following, the operations of a sensing device circuit are described with reference to FIGS. 2A to 3C. In the following, it is assumed that the first feedback capacitor $C_{S1}$ and the second feedback capacitor $C_{S2}$ are the same ($C_{S1}=C_{S2}=C_S$) in size, for the convenience of description.

FIG. 3A represents the sensing device circuit at the time sections RESET and TR1 in FIGS. 2a to 2f In this case, the first feedback capacitor $C_{S1}$ and the second feedback capacitor $C_{S2}$ are discharged by means of the reset switch $\emptyset_R$, and voltages across the first feedback capacitor $C_{S1}$ and the second feedback capacitor $C_{S2}$ are the same.

In the RESET section, the fourth switch $\emptyset_L$ is closed (ON) and the third switch $\emptyset_H$ is opened (OFF), so the voltage of the TX terminal has e.g., ground GND and a voltage of—VCM is charged across the capacitor $C_M$. If the voltage VCM is the same as ground GND, a voltage across the capacitor $C_M$ becomes zero.

FIG. 3B represents the sensing device circuit at the time section TA. In this case, the time section TA may be divided into time sections T1 and T11. In the time section T1, the third switch $\emptyset_H$ is closed (ON) and the fourth switch $\emptyset_L$ is opened (OFF), so the voltage of the TX terminal is changed from GND to VDD. In this case, since the voltage—VCM is charged across the capacitor $C_M$, the voltage of the RX terminal attempts to rise from the reference voltage VCM of the operational amplifier OA to voltage VCM+VDD as the voltage of the TX terminal is changed from GND to VDD. However, the operational amplifier OA performs discharging through an output from the operational amplifier OA in order to adjust the voltage of the RX terminal to the reference voltage VCM. Thus, since discharging is performed simultaneously with the rise of the voltage of the RX terminal, the voltage of the RX terminal rises to a certain voltage $V_T$ and then returns to voltage VCM.

Since during the time section T1, the first switch $\emptyset_1$ is ON, the discharging current of the operational amplifier OA for restoring the voltage of the RX terminal to voltage VCM flows through the first feedback capacitor $C_{S1}$ and the total charge of the discharging current is the same as the total charge for charging a charging voltage across the capacitor $C_M$ to change it from –VCM to VDD–VCM. Accordingly, it is possible to calculate a voltage that is charged across the first feedback capacitor $C_{S1}$. That is, it is possible to calculate a voltage $\Delta$VOUT that is charged across the first feedback capacitor $C_{S1}$, by using the following equation:

$$Q_{CM} = Q_{CS1}$$
$$= C_M \times ((VDD - VCM) - (-VCM))$$
$$= C_{S1} \times \Delta VOUT.$$

Thus, $|\Delta VOUT|=VDD\times(C_M/C_{S1})$. During the time section T1, a voltage of $\Delta$VOUT is charged across the first feedback capacitor $C_{S1}$ by means of the discharging charge, thus the voltage V of the output terminal VOUT1 is lower than the voltage VCM by $\Delta$VOUT. That is, $V_{VOUT1(end\ of\ T1)}=VCM-\Delta VOUT=VCM-(VDD\times(C_M/C_{S1}))$. The above state is maintained during the time section T11 after the time section T1.

FIG. 3C represents the sensing device circuit at a time section TB. In this case, the time section TB may be divided into time sections T2 and T21. In the time section T2, the second switch $\varnothing_2$ is closed and the first switch $\varnothing_1$ is opened, so the voltage of the output terminal VOUT2 starts from the voltage VCM−$\Delta$VOUT of the output terminal VOUT1. In addition, the initial voltage of the RX terminal also starts from the same voltage VCM−$\Delta$VOUT as the voltage of the output terminal VOUT2, because there is no charged voltage at the second feedback capacitor $C_{S2}$.

In this case, the fourth switch $\varnothing_L$ is closed the third switch $\varnothing_H$ is opened, so the voltage of the TX terminal is changed from VDD to GND. Since voltage VDD−VCM is charged across the capacitor $C_M$, the voltage of the RX terminal attempts to fall to a voltage lower than the start voltage VCM−$\Delta$VOUT by VDD as the TX voltage is changed from VDD to GND. However, the operational amplifier OA performs charging through an output from the operational amplifier OA in order to adjust the voltage of the RX terminal to the reference voltage VCM. Thus, since charging is performed simultaneously with the fall of the voltage of the RX terminal, the voltage of the RX terminal returns to VCM from VCM−$\Delta$VOUT−$V_T$ that is obtained by subtracting a certain voltage $V_T$.

Since during the time section T2, the second switch $\varnothing_2$ is ON, the charging current of the operational amplifier OA for restoring the voltage of the RX terminal to voltage VCM flows through the second feedback capacitor $C_{S2}$ and the total charge of the charging current is the same as the total charge for discharging a charging voltage across the capacitor $C_M$ to change it from VDD−VCM to −VCM. Accordingly, it is possible to calculate a voltage that is charged across the second feedback capacitor $C_{S2}$ at the T2 section. That is, it is possible to calculate a voltage $\Delta$VOUT that is charged across the second feedback capacitor $C_{S2}$, by using the following equation:

$$Q_{CM} = Q_{CS2}$$
$$= C_M \times ((-VCM) - (VDD - VCM))$$
$$= C_{S2} \times \Delta VOUT.$$

Thus, $|\Delta VOUT|=VDD\times(C_M/C_{S2})$. During the time section T2, a voltage of $\Delta$VOUT is charged across the second feedback capacitor $C_{S2}$ by means of the charging charge.

Thus, the voltage $V_{VOUT2}$ of the output terminal VOUT2 rises by $\Delta$VOUT from VCM. That is, $V_{VOUT2(end\ of\ T2)}=VCM+\Delta VOUT=VCM+VDD\times(C_M/C_{S2})$. Then, the above state is maintained during the time section T21.

During the time section T2, the voltage that is charged across the first feedback capacitor $C_{S1}$ maintains $\Delta$VOUT as it is. Thus, the voltage of the output terminal VOUT1 is shifted by a certain value from the voltage of the RX terminal during the time section T2. Even during the time section T21, the voltage that is charged across the first feedback capacitor $C_{S1}$ maintains $\Delta$VOUT as it is. Thus, during the time section T21, $V_{VOUT1}=VCM-\Delta VOUT$.

The sensing device circuit at a time section TC in FIGS. 2A to 2F may correspond to FIG. 3B. In this case, the time section TC may be divided into time sections T3 and T31. In the time section T3, the first switch $\varnothing_1$ is closed and the second switch $\varnothing_2$ is opened as in the time section T1, so the voltage of the output terminal VOUT1 starts from the voltage VCM+$\Delta$VOUT of the previous output terminal VOUT2. Also, the initial voltage of the RX terminal starts from a voltage of VCM+2$\Delta$VOUT that is higher than the voltage of the output terminal VOUT1 by a voltage of $\Delta$VOUT that is charged across the first feedback capacitor $C_{S1}$.

In this case, the third switch $\varnothing_H$ is closed (ON) and the fourth switch $\varnothing_L$ is opened (OFF) as in the time section T1, so the voltage of the TX terminal is changed from GND to VDD.

Since a voltage of −VCM is charged across the capacitor $C_M$, the voltage of the RX terminal attempts to rise to a voltage higher than the start voltage VCM+2$\Delta$VOUT by VDD as the TX voltage is changed from GND to VDD. However, since discharging through an output from the operational amplifier OA is performed simultaneously with the rise of the voltage of the RX terminal, the voltage returns to VCM from VCM+2$\Delta$VOUT+$V_T$ that includes a certain rise voltage $V_T$.

Since during the time section T3, the first switch $\varnothing_1$ is ON, the discharging current of the operational amplifier OA for restoring the voltage of the RX terminal to voltage VCM flows through the first feedback capacitor $C_{S1}$ and the total charge of the discharging current is the same as the total charge for changing a charging voltage across the capacitor $C_M$ to change it from −VCM to VDD−VCM. Accordingly, it is possible to calculate a voltage that is additionally charged across the first feedback capacitor $C_{S1}$. The additional charging voltage is the same as the voltage that is charged across the first feedback capacitor $C_{S1}$ at the time section T1.

Due to the discharged charge, the same voltage as $\Delta$VOUT is additionally charged in the first feedback capacitor $C_{S1}$ in addition to existing $\Delta$VOUT. Thus, the voltage of the output terminal VOUT1 is lower than VCM by 2×$\Delta$VOUT, and a voltage of VDD−VCM is charged across the capacitor $C_M$. That is, $V_{VOUT1(end\ of\ T3)}=VCM-2\Delta VOUT=VCM-2\times VDD\times(C_M/C_{S1})$.

In this case, since the voltage charged across the second feedback capacitor $C_{S2}$ is maintained as $\Delta$VOUT as it is, the voltage of the output terminal VOUT2 varies to follow the temporary change of the voltage of the RX terminal. In addition, during the time section T31, the above state is maintained.

Until the output voltages of the output terminal are accumulated, the sections after the time section TC may repetitively perform operations in the same way as the time sections TA and TB.

In Embodiment 1, it may be seen that the lengths of the time sections T1, T2, T3, . . . become longer gradually for the following reason. When discussion is performed based on the voltage of the RX terminal, in the time section T1, the voltage starts from VCM, in the time section T2, the voltage starts from VCM−ΔVOUT, in the time section T3, the voltage starts from VCM+2ΔVOUT, and in the time section T4, the voltage starts from VCM−3ΔVOUT. In this case, since the voltage of the RX terminal rises or falls by a certain voltage $V_T$ and then returns to VCM from whatever the voltage starts, the larger an absolute value of a difference value between the start voltage of each of time sections T1 to T4 and VCM is, a time when the voltage returns to VCM increases. Thus, time until the voltage returns to VCM becomes longer. That is, T1<T2<T3<T4.

In this case, the lengths of the time sections TA, TB, TC . . . are the same, so the lengths of the time sections T11, T21, T31, . . . decrease gradually.

After reset by the rest switch $\varnothing_R$ in FIG. 1A, the relative voltage difference between voltage $V_{VOUT1}$ and voltage $V_{VOUT2}$ increases when the ON/OFF operations of the switches $\varnothing_1$, $\varnothing_2$, $\varnothing_L$, and $\varnothing_H$ are repeated. In this case, the relative voltage difference may be input to an analog to digital converter (ADC) so that it is possible to obtain the voltage difference as a digital value. It is possible to estimate the value of the capacitance $C_M$ formed by the driving electrode TX and the sensing electrode RX according to a value of the voltage difference and as a result, it is possible to discern whether there is a touch input on a region where the driving electrode TX and the sensing electrode RX intersect each other, and the intensity of the touch input.

In FIG. 3A of Embodiment 1 as described above, the voltage of the TX terminal in the reset section has been set to be e.g., GND. However, in an embodiment modified therefrom, it is possible to set the voltage of the TX terminal to e.g., VDD in the reset section, in which case a voltage of +VCM may be charged across a capacitor. Then, the operation of the device 100 may be performed by the same principle as the above-described embodiment. That is, the present disclosure is not limited to the voltage of the TX terminal in the reset section.

Embodiment 2

Figure 4:
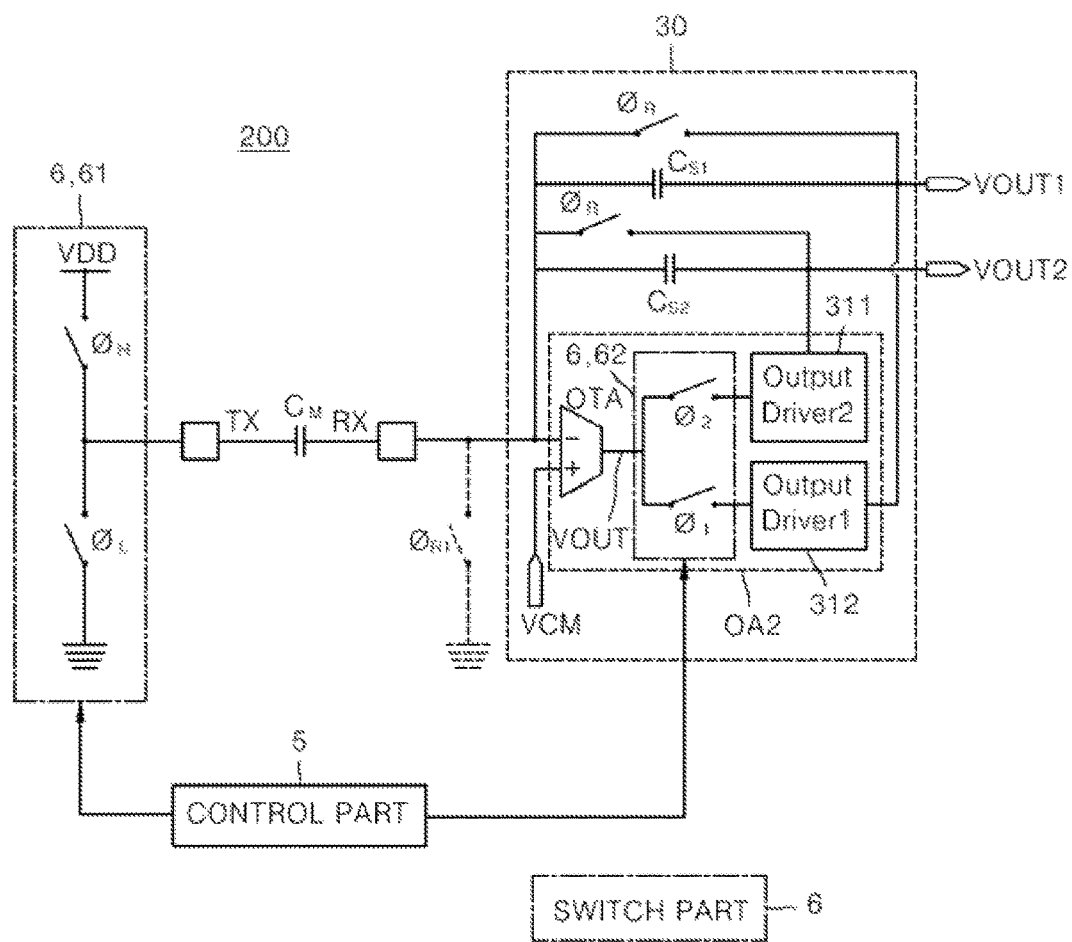
FIG. 4 represents the fundamental structure of a sensing device 200 that uses a single operational transconductance amplifier (OTA) and two output drivers in order to measure whether there is a touch input to a capacitive type touch panel in accordance with a second embodiment.

FIG. 4 represents the fundamental structure of a sensing device 200 that uses a single operational transconductance amplifier (OTA) and two output drivers in order to measure whether there is a touch input to a capacitive type touch panel in accordance with a second embodiment.

FIGS. 5A to 5F are timing diagrams that represent states according to a time at switches $\varnothing_R$, $\varnothing_1$, and $\varnothing_2$ and terminals TX, RX, VOUT1, and VOUT2 of the sensing device 200 in FIG. 4.

Figure 5:
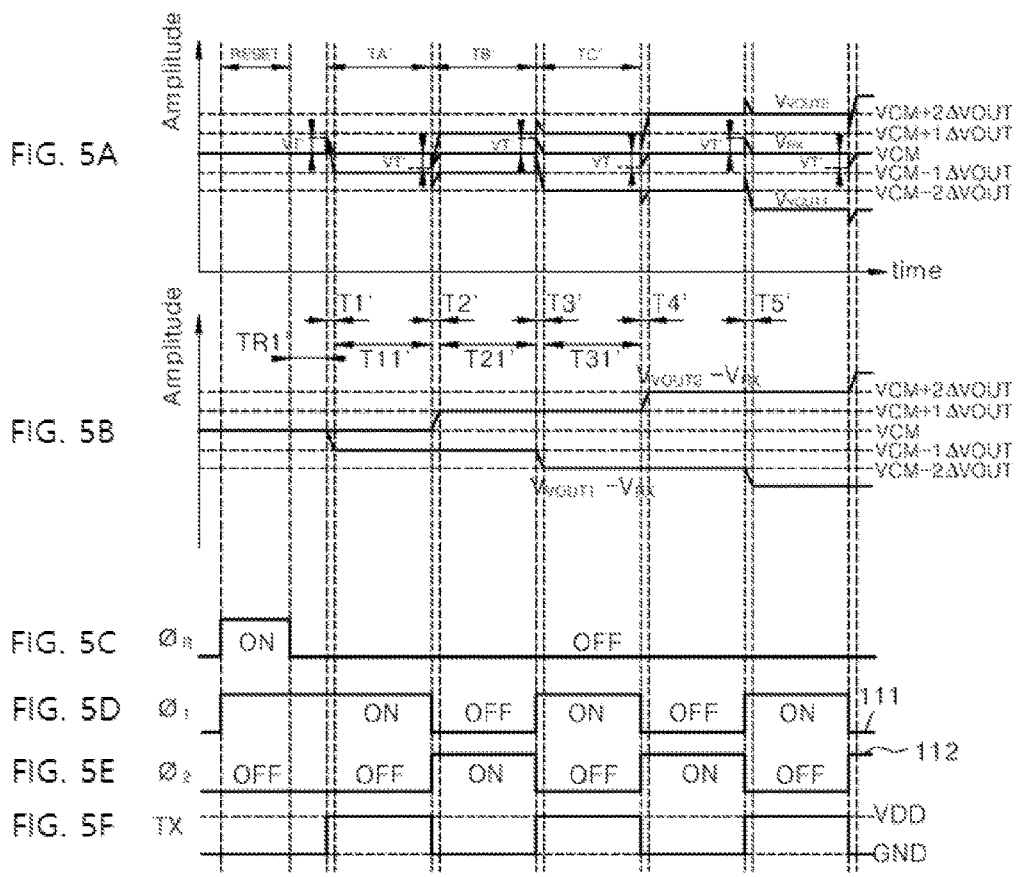
FIGS. 5A to 5F are timing diagrams that represent, according to a time, states at switches $\emptyset_R$, $\emptyset_1$, and $\emptyset_2$ and terminals TX, RX, VOUT1, and VOUT2 of the sensing device 200 in FIG. 4.

FIG. 5A is a graph that represents, according to a time, the voltage $V_{VOUT1}$ of the output terminal VOUT1, the voltage $V_{VOUT2}$ of the output terminal VOUT2, and the voltage $V_{RX}$ of the RX terminal.

FIG. 5B is a graph that represents, according to a time, the voltage difference between the output terminal VOUT1 and the RX terminal, and the voltage difference between the output terminal VOUT2 and the RX terminal.

FIGS. 5C to 5E represent, according to a time, the ON and OFF states of the reset switch $\varnothing_R$), the first switch $\varnothing_1$, and the second switch $\varnothing_2$, respectively.

In addition, FIG. 5F represents the voltage of the driving electrode TX according to a time. The voltage of the driving electrode TX may be controlled according to the ON/OFF state of the third and fourth switches $\varnothing_H$ and $\varnothing_L$. In this case, the third and fourth switches $\varnothing_H$ and $\varnothing_L$ do not simultaneously have ON states.

When comparing FIG. 1A with FIG. 4, the single operational amplifier OA in the sensing device in FIG. 1A includes a single operational transconductance amplifier OTA (not shown) and a single output driver (not shown) but the single operational amplifier OA2 in the sensing device in FIG. 4 includes a single operational transconductance amplifier OTA and two output drivers 311 and 312.

In the first embodiment, since the output terminal of the operational transconductance amplifier OTA in the operational amplifier OA is connected directly to any one of the output terminals VOUT1 and VOUT2 at all times, the output voltage value of the output terminal of any time section (e.g., time section T11) may affect the start voltage value of the output terminal of the current time section (e.g., time section T2).

However, in the configuration of the second embodiment, since respective output drivers 311 and 312 connect the output part VOUT to respective output terminals VOUT1 and VOUT2 and the inputs of respective output drivers are electrically separated from each other by means of the first switch $\varnothing_1$ and the second switch $\varnothing_2$, the voltage value of the output terminal VOUT1 and the voltage value of the output terminal VOUT2 do not affect each other. Thus, when the two output drivers are used for the single operational transconductance amplifier, the voltage starts from voltages charged in the feedback capacitors $C_{S1}$ and $C_{S2}$ that are connected to the output terminals VOUT1 and VOUT2, respectively, unlike when a single operational amplifier OA is used. That is, the voltage starts from the output voltages of the output terminals VOUT1 and VOUT2 in time sections T11', T21', T31', . . . .

For example, the start voltage of the output terminal VOUT2 in the time section T2' is not the voltage VCM−ΔVOUT of the output terminal VOUT1 in the time section T11' but the voltage VCM of the output terminal VOUT2 in the time section T11'. Also, the start voltage of the output terminal VOUT1 in the time section T3' is not the same as the voltage VCM+ΔVOUT in the output terminal VOUT2 in the time section T21' but is the same as the voltage VCM−ΔVOUT of the output terminal VOUT1 in the time section T21'.

The start voltage of the RX terminal starts from a voltage higher (or lower) by a voltage charged in the feedback capacitor connected to the output terminal, than the start voltage of the output terminal in a corresponding time section.

For example, the start voltage of the RX terminal in the time section T2' starts from a voltage lower than the start voltage VCM of the output terminal VOUT2 by a voltage charged across the feedback capacitor (e.g., $C_{S2}$), in which case since there is no voltage charged across the feedback capacitor (e.g., $C_{S2}$), the start voltage of the RX terminal starts from the start voltage VCM of the output terminal VOUT2.

Also, the start voltage of the RX terminal in the time section T3' starts from a voltage VCM higher than the start voltage VCM−ΔVOUT of the output terminal VOUT1 by the voltage ΔVOUT charged across the feedback capacitor (e.g., C0 connected to the output terminal.

Also, the start voltage of the RX terminal in the time section T4' starts from a voltage VCM lower than the start voltage VCM+ΔVOUT of the output terminal VOUT2 by the voltage ΔVOUT charged across the feedback capacitor (e.g., $C_{S2}$) connected to the output terminal.

The start voltages of the RX terminals in the following time sections are determined in the same way and as a result, the start voltages of the RX terminals may be the same as VCM.

In this case, since as in the first embodiment, the start voltage of the RX terminal attempts to rise (or fall) to a voltage higher (or lower) than the start voltage VCM by VDD but at the same time, discharging (or charging) is performed through an output through the operational transconductance amplifier OTA and the output drivers, the voltage rises (or falls) by a certain voltage (e.g., $V_T'$) from the start voltage and then returns to VCM. In this case, the voltages of the output terminals VOUT1 and VOUT2 that are connected to closed switches $Ø_1$ and $Ø_2$ in corresponding time sections T1', T2', T3', T4', . . . also rise (or fall) by a certain voltage (e.g., $V_T'$) from the start voltage. In addition, a voltage corresponding to ΔVOUT is additionally charged across the feedback capacitors $C_{S1}$ and $C_{S2}$ by means of the discharged (or charged) charge, and the output terminal has a lower (or higher) voltage by the charged voltage.

In summary, it is different from the first embodiment in that in the second embodiment, the start voltages of the output terminals VOUT1 and VOUT2 are charged voltages in all time sections and the start voltage of the RX terminal is VCM at all times, because the start voltages of the output terminals VOUT1 and VOUT2 and the RX terminal in time sections T1', T2', T3', T4', . . . do not affect each other.

The operation method of remaining time sections T1', T2', T3', T4', . . . in the second embodiment may be the same as that of the first embodiment.

In this case, since the start voltage of the RX terminal is the same as VCM at all times, it may be seen that the lengths of time sections T1', T2', T3', T4', . . . may be the same. Also, the lengths of time sections TA', TB', TC' . . . are the same one another, so the lengths of time sections T11', T21', T31' . . . are also the same one another.

Comparative Embodiment

Figure 6:
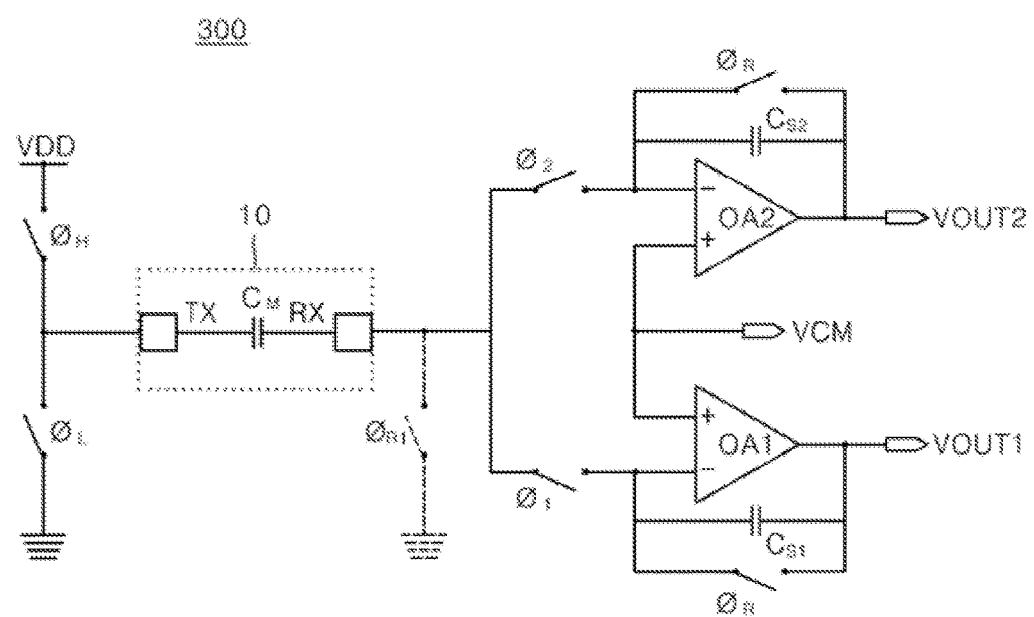
FIG. 6 represents the fundamental structure of a sensing device 300 that uses two OAs in order to measure whether there is a touch input to a capacitive type touch panel

FIG. 6 represents the fundamental structure of a sensing device 300 that uses two operational amplifiers OA in order to measure whether there is a touch input to a capacitive type touch panel.

The sensing device 300 may include a first operational amplifier OA1, a second operational amplifier OA2, and a capacitor $C_M$. The inverting input terminals—of the first operational amplifier OA1 and the second operational amplifier OA2 are connected to the sensing electrode RX that acts as one terminal of the capacitor $C_M$, through the first switch $Ø_1$ and the second switch $Ø_2$, respectively. In addition, the driving electrode TX that acts as the other terminal of the capacitor $C_M$ is selectively connected to the first voltage (e.g., VDD) and the second voltage (e.g., GND) through the third switch $Ø_H$ and the fourth switch $Ø_L$.

The inverting input terminal—and output terminal VOUT1 of the first operational amplifier OA1 are connected to each other through the first feedback capacitor $C_{S1}$, and the inverting input terminal—and output terminal VOUT2 of the second operational amplifier OA2 are connected to each other through the second feedback capacitor $C_{S2}$. In addition, the non-inverting input terminals+of the first operational amplifier OA1 and the second operational amplifier OA2 may all be connected to VCM. In this case, the voltage VCM may be ground GND or have a certain voltage value. In addition, the reset switches $Ø_R$ may connect the inverting input terminals—and output terminals of the first operational amplifier OA1 and the second operational amplifier OA2.

FIGS. 7A to 7F are timing diagrams that represent, according to a time, states at switches $Ø_R$, $Ø_1$, and $Ø_2$ and terminals TX, RX, VOUT1, and VOUT2 of the sensing device 300 in FIG. 6.

Figure 7:
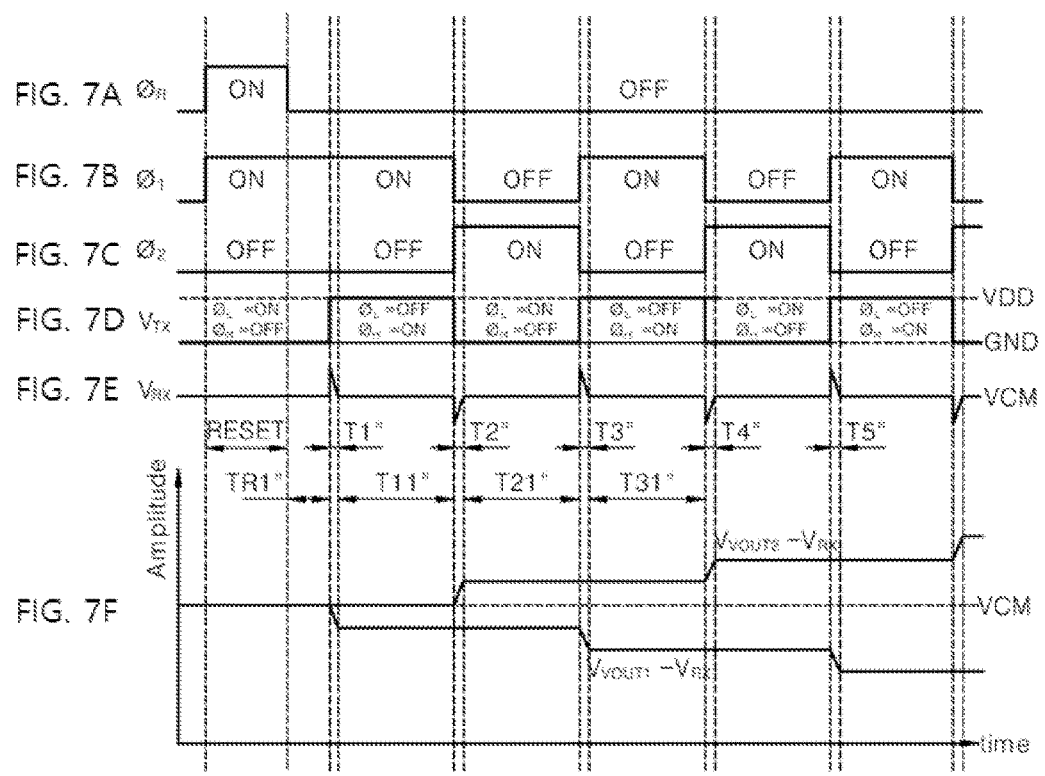
FIGS. 7A to 7F are timing diagrams that represents, according to a time, states at switches $\emptyset_R$, $\emptyset_1$, and $\emptyset_2$ and terminals TX, RX, VOUT1, and VOUT2 of the sensing device 300 in FIG. 6.

FIGS. 7A to 7C represent, according to a time, the ON and OFF states of the reset switch $Ø_R$, the first switch $Ø_1$, and the second switch $Ø_2$, respectively.

FIGS. 7D and 7E represent, according to a time, the voltages of the driving electrode TX and the sensing electrode RX, respectively. The voltage of the driving electrode TX may be controlled according to the ON/OFF state of the switches $Ø_H$ and $Ø_L$. In this case, the switches $Ø_H$ and $Ø_L$ do not simultaneously have ON states.

In addition, FIG. 7F is a graph that represents, according to a time, the voltage difference between the output terminal VOUT1 and the RX terminal, and the voltage difference between the output terminal VOUT2 and the RX terminal.

When comparing FIG. 6 with FIG. 4, the circuit in FIG. 4 uses a single operational transconductance amplifier OTA and two output drivers 311 and 312 so that the voltages of the output terminals VOUT1 and VOUT2 may not affect each other, and the circuit in FIG. 6 uses two operational amplifiers OA to separate the output terminals VOUT1 and VOUT2 so that the voltages of the output terminals VOUT1 and VOUT2 may not affect each other. Thus, as represented in FIG. 5A and FIG. 7E, it may be seen that the start voltage of the RX terminal in each time section is the same as VCM. Thus, as the lengths of time sections T1', T2', T3', T4', . . . in FIGS. 5A to 5F are the same, so the lengths of time sections T1", T2", T3", T4", . . . in FIGS. 7A to 7F may also be the same.

When comparing FIGS. 2A to 2F, 5A to 5F and 7A to 7F, FIG. 2B, FIG. 5B, and FIG. 7F are all graphs that represent the voltage difference between the output terminals VOUT1 and VOUT2 and the RX terminal and it may be seen that it is possible to obtain similar results when a single operational amplifier OA is used, when a single operational transconductance amplifier OTA capable of functioning as a single operational amplifier OA and two output drivers are together used, and when two operational amplifiers OA are used.

Figure 8:
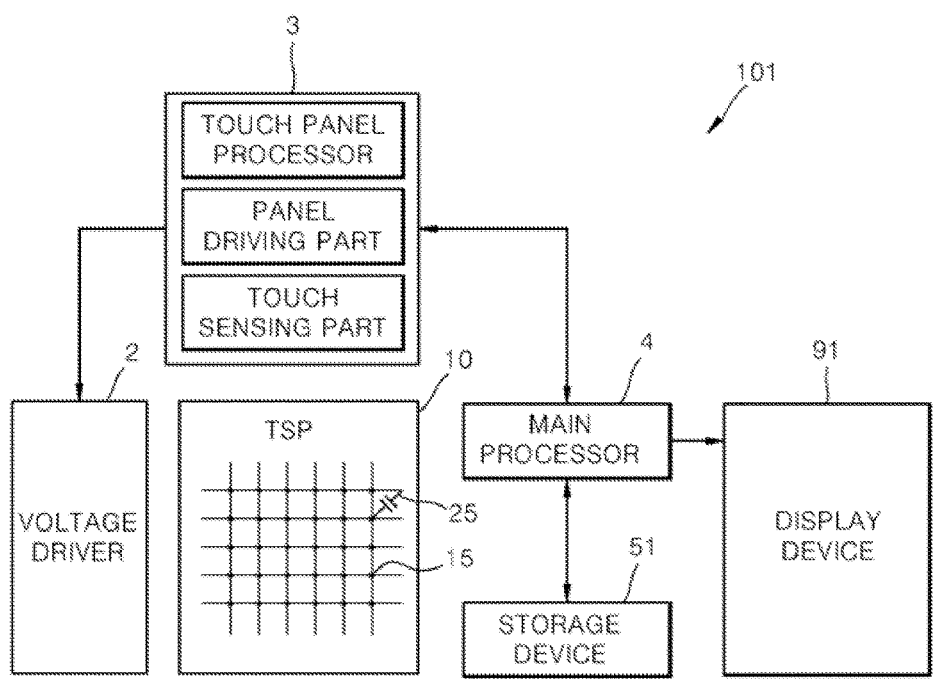
FIG. 8 represents an example of an electronic device that utilizes the TSP as described in FIG. 1A.

FIG. 8 represents an example of an electronic device that utilizes the TSP as described in FIG. 1A.

An electronic device 101 may receive a user input signal through a TSP 10. The TSP 10 may include a substrate on which an electrode pattern is formed in the form of a matrix. The electronic device 101 may include the TSP 10 configured to be capable of transmitting a touch input signal, a touch panel control device 3 outputting a signal for driving the TSP 10 and receiving an input signal from the TSP 10, a voltage driver 2 receiving a touch panel driving signal from the touch panel control device 3 to generate a touch panel driving voltage, a main processor 4 receiving a touch input signal from the touch panel control device 3 to execute a program stored in a storage device 51, the storage device 51 storing one or more programs executed according to the touch input signal, and a display device 91 displaying a result processed by the main processor 4. The display device 91 and the TSP 10 may overlap each other.

The touch panel control device 3 may include a touch sensing part sensing a signal input from the TSP 10, a panel driving part generating a touch panel driving signal to be transmitted to the TSP 10, and a touch panel processor controlling them. The touch panel processor may be a re-programmable processor or a processor of a type operating by a dedicated logic, such as a state machine.

Moreover, the electronic device 101 may include a RAM or storage devices of other types and may further include another device such as watchdog, though not shown.

The TSP 10 may be conceptually divided into rows and columns. The intersection of each row and each column may be referred to as a 'node' or 'touch node'. As a result, matrix type nodes may be defined, and when a touch input is performed, it is possible to identify on which node the touch input is performed.

Figure 9:
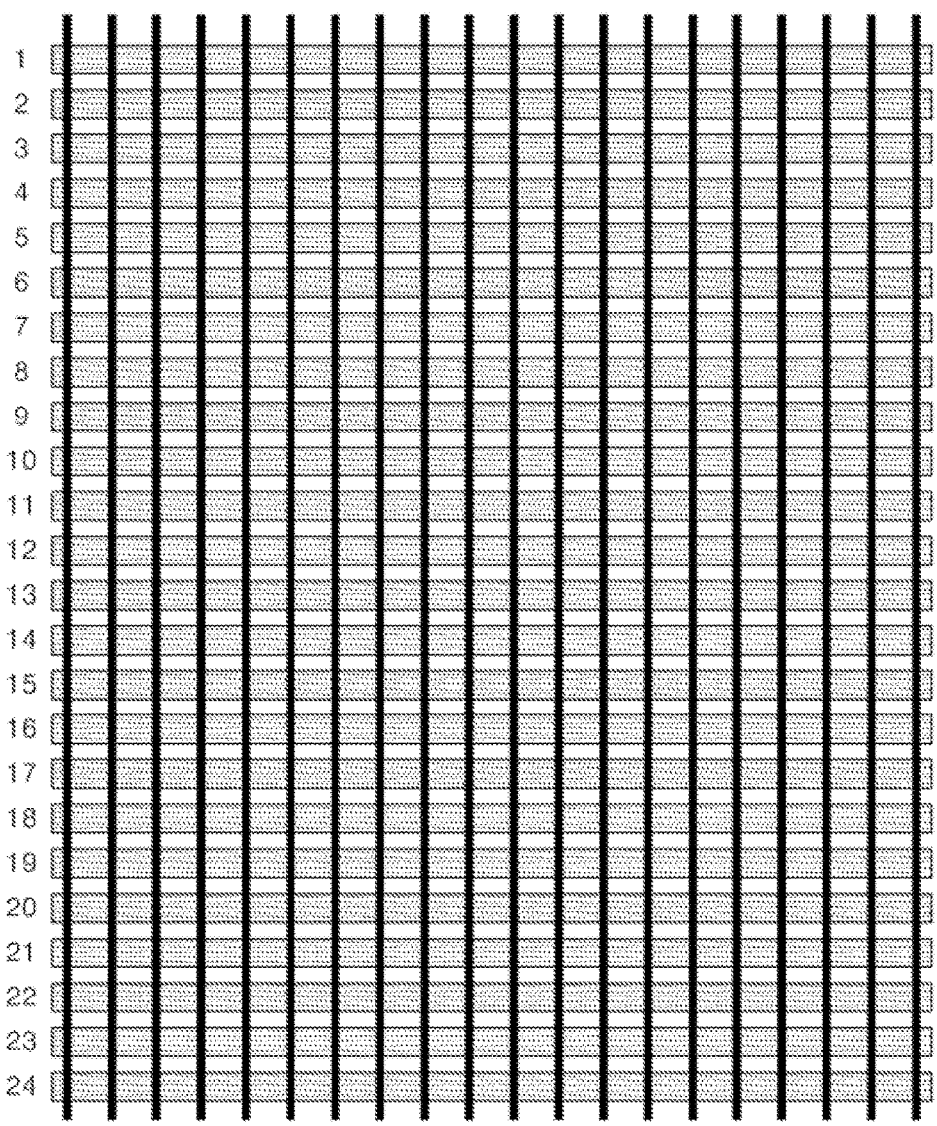
FIG. 9 represents an example of the structure of the TSP as described in FIG. 1A.

In order to implement the concept of the rows and columns, it is possible to use so-called a 'self type' touch panel or 'mutual type' touch panel. FIG. 9 represents an example of a mutual type touch panel.

FIG. 9 represents an example of the structure of the TSP as described in FIG. 1A.

In FIG. 9, first type electrodes (horizontally-extended rectangular electrodes) may be disposed on a first surface of a dielectric substrate and second type electrodes (vertically-extended, thick solid line-shaped electrodes) may be disposed on a second surface of the dielectric substrate. The first type electrodes may be electrically isolated from the second type electrodes by means of the dielectric substrate.

The first type electrodes may spatially intersect with the second type electrodes. Each intersection may be defined as the node. FIG. 9 represents an example of 24 rows and 20 columns, so 24*20 nodes may be defined.

The example in FIG. 9 is only an embodiment, and many literatures disclose embodiments in which the first type electrodes and the second type electrodes of the mutual type touch panel are disposed together on the first surface of the dielectric substrate.

The capacitance measurement circuit according to the above comparative embodiment uses two operational amplifiers OA for a single measurement channel in order to remove DC noise or low-frequency noise. However, since two OAs are used for the single measurement channel, there is a drawback in that the area of the circuit increases. On the contrary, according to the first and second embodiments of the present disclosure and various embodiments that may be modified therefrom, it is possible to obtain an advantageous effect in that it is possible to decrease the area occupied by a touch input sensing circuit because only a single operational amplifier OA is required.

According to the present disclosure, it is possible to provide a touch input sensing circuit that may provide the same or similar result as when two operational amplifiers OA are used, by using a single operational amplifier OA, and decrease the area of a sensing device. In this case, when the single operational amplifier OA is made up of a single operational transconductance amplifier OTA and two output drivers, it is possible to further enhance performance.

A person skilled in the art to which the present disclosure pertains may easily implement various variations and modifications without departing from the essential characteristic of the present disclosure, by using the above-described embodiments of the present disclosure. The details of each claim in the following claims may be combined with other claims not dependent thereon as long as it is possible to understand through the specification.

What is claimed is:

1. A method for sensing a touch input using a touch input sensing device comprising an operational amplifier including an operational transconductance amplifier, a first output driver, a second output driver, a first switch connecting between an output terminal of the operational transconductance amplifier and an input terminal of the first output driver, and a second switch connecting between the output terminal of the operational transconductance amplifier and an input terminal of the second output driver, the method comprises:

a first step of controlling a voltage of a driving electrode to become a first voltage, and connecting a first feedback capacitor to the output terminal of the operational transconductance amplifier via the first switch and the first output driver to form a first feedback path by turning on the first switch and turning off the second switch, one terminal of the first feedback capacitor being connected to an inverting input terminal of the operational amplifier, and the other terminal of the first feedback capacitor being connected to an output terminal of the first output driver; and after the first step, a second step of controlling the voltage of the driving electrode to become a second voltage, and connecting a second feedback capacitor to the output terminal of the operational transconductance amplifier via the second switch and the second output driver to form a second feedback path, one terminal of the second feedback capacitor being connected to the inverting input terminal and the other terminal of the second feedback capacitor being connected to an output terminal of the second output driver, wherein, the first feedback path is disconnected while the second feedback path is formed, and the second feedback path is disconnected while the first feedback path is formed, the voltage difference between a first output voltage of the other terminal of the first feedback capacitor and a second output voltage of the other terminal of the second feedback capacitor is provided to an analog-to-digital converter as an output of the touch input sensing device, and the driving electrode is capacitively coupled to a sensing electrode connected to the inverting input terminal.

2. A touch input sensing device comprising:

an operational amplifier comprising an operational transconductance amplifier, a first output driver, a second output driver, a first switch connecting between an output terminal of the operational transconductance amplifier and an input terminal of the first output driver, and a second switch connecting between the output terminal of the operational transconductance amplifier and an input terminal of the second output driver;

a first feedback capacitor configured to be connected to an inverting input terminal of the operational amplifier, one terminal of the first feedback capacitor being connected to the inverting input terminal of the operational amplifier, and the other terminal of the first feedback capacitor being connected to an output terminal of the first output driver;

a second feedback capacitor configured to be connected to the inverting input terminal of the operational amplifier, one terminal of the second feedback capacitor being connected to the inverting input terminal of the operational amplifier, and the other terminal of the second feedback capacitor being connected to an output terminal of the second output driver;

a first output terminal formed at the other terminal of the first feedback capacitor;

a second output terminal formed at the other terminal of the second feedback capacitor;
and
a control part,
wherein,
the control part is configured to perform:
  a first step of turning on the first switch and turning off the second switch in order that the first feedback capacitor is connected to the output terminal of the operational transconductance amplifier via the first switch and the first output driver to form a first feedback path; and
  after the first step, a second step of turning off the first switch and turning on the second switch in order that the second feedback capacitor is connected to the output terminal of the operational transconductance amplifier via the second switch and the second output driver to form a second feedback path,
the first feedback path is disconnected while the second feedback path is formed, and the second feedback path is disconnected while the first feedback path is formed,
the driving electrode is capacitively coupled to a sensing electrode connected to the inverting input terminal, and
the voltage difference between a first output voltage of the first output terminal and a second output voltage of the second output terminal is provided as an output of the touch input sensing device.

3. A touch input sensing device comprising:
an operational amplifier;
a first feedback capacitor connected to an inverting input terminal of the operational amplifier through one terminal of the first feedback capacitor;
a second feedback capacitor connected to the inverting input terminal of the operational amplifier through one terminal of the second feedback capacitor;
a first switch connecting an output terminal of the operational amplifier to the other terminal of the first feedback capacitor to form a first feedback path, the first switch being operated according to a first pulse train; and
a second switch connecting the output terminal of the operational amplifier to the other terminal of the second feedback capacitor to form a second feedback path, the second switch being operated according to a second pulse train;
wherein,
the first feedback path is disconnected while the second feedback path is formed, and the second feedback path is disconnected while the first feedback path is formed,
the first pulse train and the second pulse train have time-domain shapes such that the first switch and the second switch is not simultaneously in a closed state,
the voltage difference between a first output voltage of the other terminal of the first feedback capacitor and a second output voltage of the other terminal of the second feedback capacitor is provided as an output of the touch input sensing device,
the operational amplifier comprises an operational transconductance amplifier, a first output driver, and a second output driver,
the other terminal of the first feedback capacitor is connected to an output terminal of the first output driver,
the other terminal of the second feedback capacitor is connected to an output terminal of the second output driver,
the first switch connects between an output terminal of the operational transconductance amplifier and an input terminal of the first output driver, and
the second switch connects between the output terminal of the operational transconductance amplifier and an input terminal of the second output driver.

4. A touch input sensing device of claim 3, further comprising
a driving part controlling a voltage of a driving electrode capacitively coupled to a sensing electrode connected to the inverting input terminal,
wherein, the driving part is configured to control the voltage of the driving electrode so that the voltage of the driving electrode switches between a first voltage and a second voltage by being synchronized with the first pulse train or the second pulse train.

5. A touch input sensing device of claim 3, wherein,
the inverting input terminal of the operational amplifier is an inverting input terminal of the operational transconductance amplifier, and
the non-inverting input terminal of the operational amplifier is a non-inverting input terminal of the operational transconductance amplifier.

6. A touch IC for a touch input sensing device comprising a sensing electrode, and a driving electrode capacitively coupled to the sensing electrode, the touch IC comprising:
  an operational amplifier comprising an operational transconductance amplifier, a first output driver, a second output driver, a first switch connecting between an output terminal of the operational transconductance amplifier and an input terminal of the first output driver, and a second switch connecting between the output terminal of the operational transconductance amplifier and an input terminal of the second output driver;
  a first feedback capacitor configured to be connected to an inverting terminal of the operational amplifier, one terminal of the first feedback capacitor being connected to the inverting input terminal of the operational amplifier, and the other terminal of the first feedback capacitor being connected to an output terminal of the first output driver;
  a second feedback capacitor configured to be connected to the inverting terminal of the operational amplifier, one terminal of the second feedback capacitor being connected to the inverting input terminal of the operational amplifier, and the other terminal of the second feedback capacitor being connected to an output terminal of the second output driver; and
  a feedback path selection switch part,
wherein, the feedback path selection switch part is configured to connect the output terminal of the operational transconductance amplifier selectively to one of the input terminal of the first output and the input terminal of the second output driver by selectively turning on the first switch and the second switch,
when the output terminal of the operational transconductance amplifier is connected to the input terminal of the first output driver, a first feedback path is formed between the inverting terminal of the operational transconductance amplifier and the output terminal of the operational transconductance amplifier,
when the output terminal of the operational transconductance amplifier is connected to the input terminal of the second output driver, a second feedback path is formed between the inverting terminal of the operational transconductance amplifier and the output terminal of the operational transconductance amplifier, the first feedback path is disconnected while the second feedback path is formed, and the second feedback path is disconnected while the first feedback path is formed, and the voltage difference between a first output voltage of the other terminal of the first feedback capacitor and a second output voltage of the other terminal of the second feedback capacitor is provided as an output of the touch input sensing device.

7. A touch IC of claim 6, further comprising a driving part and a control part, wherein, the feedback path selection switch part is configured to be connected to the control part, and the control part is configure to perform:

a first step for controlling the driving part and the feedback path selection switch part in order that a voltage of the driving electrode becomes a first voltage, and the output terminal of the operational transconductance amplifier is connected to the input terminal of the first output driver to form the first feedback path; and a second step for controlling the driving part and the feedback path selection switch part in order that the voltage of the driving electrode becomes a second voltage, and the output terminal of the operational transconductance amplifier is connected to the input terminal of the second output driver to form the second feedback path.

* * * * *